United States Patent Office 3,328,350
Patented June 27, 1967

3,328,350
STABILIZED ORGANOSILICON POLYMERS
George M. Omietanski, Marietta, Ohio, and Wallace G. Reid, Grand Island, N.Y., assignors to Union Carbide Corporation, a corporation of New York
No Drawing. Filed July 5, 1966, Ser. No. 562,498
7 Claims. (Cl. 260—46.5)

This application is a continuation-in-part of application Ser. No. 258,897, filed Feb. 15, 1963, now abandoned.

This invention relates to novel organosilicon polymers having improved stability against oxidative degradation.

Although organosilicon polymers are fairly stable towards oxidation, when exposed for a long time to oxidation at, say, 200°–300° C., fluids increase in viscosity and finally gel and elastomers lose elasticity and finally become brittle. Antioxidants which have been added to improve the stability of these materials are moderately effective but in many instances introduced such undesirable tendencies as the formation of haze or sludge, or a lowering of the electrical insulating properties of the organosilicon polymers.

We have found that certain novel organosilicon polymers have a superior stability towards oxidative degradation. Further, when such polymers are added to other conventional organosilicon polymers they impart improved stability to the latter.

The novel organosilicon polymers of this invention are the reaction products of certain substituted phenols with acyloxy terminated polysiloxanes. The acyloxy termination may be at only one end of the siloxane, as in: $Me_3SiO(Me_2SiO)_nAc$, or at both ends, as in:

$$AcO(Me_2SiO)_nAc$$

in which Ac represents acyl radical and $n$ is on the average one or more. The reaction of the substituted phenol is with the acyloxy termination. Accordingly, the reaction products will have phenolic radicals on one or both ends, depending on the starting silicone.

The polymers of this invention have average compositions within either the general formula:

$$R'O(R_2SiO)_nR' \qquad (I)$$

or the general formula:

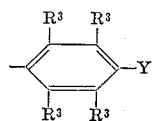

(II)

wherein $n$ is from 3 to 50 and is preferably from 3 to 8; $p$ is from 1 to 50; R is a methyl, ethyl, propyl, isopropyl, butyl, amyl, vinyl, allyl, methallyl, phenyl, benzyl, tolyl, ethylphenyl or phenylethy radical; R' is a radical selected from the group consisting of hydrogen, $R_3Si$, $R^2CO$ and a substituted phenyl radical having the formula:

Y is selected from the group consisting of —$NHC_6H_5$,

—$OCH_2C_6H_5$ and —$NHCO(CH_2)_mCH_3$; $m$ is an integer from 1 to 20; $R^2$ is a methyl, ethyl, propyl, isopropyl, or butyl radical; $R^3$ is hydrogen or an alkyl radical; $R^4$ is hydrogen or $R^2CO$; and at least one R' in Formula I is said substituted phenyl radical.

The polymer compounds of this invention generally should have a silicon to organic substituent mole ratio from about 3 to 50, preferably from about 3 to about 20.

Illustrative of the novel polymers of this invention are the following in which "Me" represents a methyl ($CH_3$)-radical, "Et" an ethyl ($C_2H_5$)-radical; and "(—$C_4H_9$)" means tertiary butyl:

$Me_3SiO(Me_2SiO)_3$-para $C_6H_4NHC_6H_5$;
$Me_3SiO(Me_2SiO)_3$-para $C_6H_4NHCO(CH_2)_{16}CH_3$;
para $C_6H_5NHC_6H_4O(Me_2SiO)_{7.45}$-para $C_6H_4NHC_6H_5$;
para $C_6H_5CH_2OOC_6H_4O(MeSiO)_{7.45}$-para $C_6H_4OCH_2C_6H_5$;

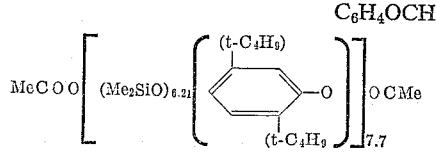

Although these novel polymers are most conveniently produced by literally reacting acyloxy siloxanes with the appropriate substituted phenol, the same result can be obtained by using the sodium or potassium salt of the phenol. The reaction can be carried out in the temperature range of about 0° C. to about 250° C., preferably between 25° C. and 200° C., at atmospheric pressure or above or below atmospheric. At room temperature, a base such as pyridine is needed to promote the reaction, but at elevated temperatures the reaction proceeds smoothly without promoter.

Alternatively, the polymers of the invention may be produced by equilibration techniques using usual acid and basic equilibration catalysts, for instance:

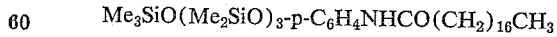

The novel polymers of this invention can be used in known manner to form organosiloxane oils and gums. The oils are usable as lubricants, hydraulic fluids, etc. The gums can be used for gaskets, etc., and can be mixed with suitable fillers and curing agents on standard differential rolls, then molded conventionally and if desired, further cured or heat treated conventionally.

The polymers of this invention are miscible with other organosiloxane polymers at both high and low temperatures and when so mixed, show a high ability to protect the latter against oxidative degradation.

Example I

In a small, round-bottom flask equipped with a thermometer well, were placed equimolar amounts of $Me_3SiO(Me_2SiO)_3Ac$ (9.0 g., 0.0253 mole) and N-stearoyl-p-aminophenol (9.5 g., 0.0253 mole). By-product acetic acid was removed by heating at 150° C./100 mm. Hg for four hours, followed by one hour at 150° C./0.3 mm. Hg. The product, $$Me_3SiO(Me_2SiO)_3\text{-}p\text{-}C_6H_4NHCO(CH_2)_{16}CH_3$$

was obtained as a purple waxy solid in 94 mole percent yield. Calculated for $Me_3SiO(Me_2SiO)_3\text{-}p\text{-}C_6H_4NHCO(CH_2)_{16}CH_3$ 59.14% C, 10.08% H, 16.75% Si. Found: 57.8% C, 9.8% H, 16.1% Si. Infrared spectroscopy analysis results were consistent with the above structure.

Example II

Heating p-anilinophenol (13.0 g., 0.07 mole) with $Me_3SiO(Me_2SiO)_3Ac$ (27.3 g., 10% excess) at 150° C./120–0.5 mm. Hg until acetic acid was no longer evolved (3 hours), followed by fractionation, gave 86 mole percent yield of $Me_3SiO(Me_2SiO)_3\text{-}p\text{-}C_6H_4NHC_6H_5$ having a B.P. of 150° C./0.15 mm. Hg, refractive index of $n_D^{25}=1.4950$ and density of $d^{25}=1.0138$. Calculated for $Me_3SiO(Me_2SiO)_3$-p-$C_6H_4NHC_6H_5$: 52.57% C, 7.77% H, 2.92% N, 23.39% Si. Found: 52.6% C, 7.4% H, 2.9% N, 23.3% Si. Infrared spectroscopy analysis results were consistent with the above structure.

Example III

To a one-liter, 3-necked flask equipped with a stirrer, gas sparge tube, condenser and heating mantle, were charged $AcO(Me_2SiO)_{7.45}Ac$ (332.0 g., 0.508 mole) and p-$HOC_6H_4NHC_6H_5$ (189.0 g., 1.02 moles). The reaction mixture was heated at 120–131° C. for four hours, while dry nitrogen gas was passed through the reaction mixture. During this period acetic acid, a by-product of the reaction, was removed. The remaining acetic acid was removed by heating the reaction mixture at 133° C./20 mm. Hg for about one hour. The dark colored product was cooled under dry nitrogen to room temperature and filtered. There was obtained a nearly quantitative yield of p-$C_6H_5NHC_6H_4O(Me_2SiO)_{7.45}$-p-$C_6H_4NHC_6H_5$ having a viscosity of 96 centistokes at 25° C. Calculated: 3.1% N. Found: 3.1% N.

Example IV

In a small, round-bottom flask equipped with a thermometer well and a gas sparge tube were placed p-$HOC_6H_4OCH_2C_6H_5$ (22.0 g., 0.12 mole) and $AcO(Me_2SiO)_{7.45}Ac$ (33.0 g., 0.051 mole). The reaction mixture was heated, using a dry nitrogen sparge, for 12 hours at 125° C., for six hours at 155° C., and for 7.5 hours at 175–178° C. The product was a dark liquid having a viscosity of 49.5 centistokes at 25° C. and had a silicon analysis of 22.5% corresponding to p-$C_6H_5CH_2OC_6H_4O(Me_2SiO)_{7.45}$-p-$C_6H_4OCH_2C_6H_5$ The observed molecular weight, determined on a vapor pressure osmometer, of the fluid was 939. The calculated molecular weight was 933.

Example V

Equimolar amounts (0.1 mole) of $AcO(Me_2SiO)_{6.21}Ac$ and 2,5-di-tert-butyl hydroquinone were heated together in a small round-bottom flask, equipped with a thermometer well, for about four hours at 200° C. During the last part of the heating cycle the pressure was reduced to 0.5 mm. Hg. By-product acetic acid and unreacted 2,5-di-tert-butyl hydroquinone were removed by volatilization. A copolymeric residue (61.5 g.) was obtained which had an acetoxy content (by titration of 2.27%. This acetoxy value would correspond to a copolymer having the formula:

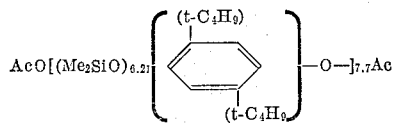

Example VI

Various amounts of a dimethylpolysiloxane oil having a viscosity of 100 centistokes at 25° C. were mixed with various novel stabilizers and the mixtures were placed into 50 ml. beakers. The beakers, lightly covered with watch glasses, together with a watch-glass covered beaker containing only the dimethylpolysiloxane oil, were placed into a 250° C. air-circulating oven. The time required to form a gel was determined by both visual and physical inspection; the tendency for sludge formation was also noted. The results of these tests are shown in the following table.

TABLE.—THE EFFECTS OF ANTI-OXIDANTS IN DIMETHYLSILOXANE OIL AT 250° C

| Anti-Oxidant | Weight Percent of Additive | Weight Percent "Organic Substituent" | Days to Gel | Comment |
| --- | --- | --- | --- | --- |
| Example V Product | 1.0 | 0.33 | 6 | Completely miscible, no sludging. |
| Example I Product | 1.0 | 0.55 | 21 | Do. |
| N-stearoyl-p-aminophenol | 1.0 | 1.0 | 8 | Sludge formed. |
| Example II Product | 1.0 | 0.37 | 14 | Competely miscible, no sludging. |
| p-Anilinophenol | 1.0 | 1.0 | 10 | Visible sludging. |
| Example III Product | 0.1 | 0.041 | 18 | Completely miscible, no sludging. |
| p-Anilinophenol | 0.1 | 0.1 | 5 | Some sludging. |
| Example IV Product | 0.1 | 0.042 | 6 | Completely miscible, no sludging. |
| p-$HOC_6H_4OCH_2C_6H_5$ | 0.1 | 0.1 | 2 | Miscible, no sludging. |
| None | | | 1–2 | Control oil. |

What is claimed is:

1. An organosilicon polymer having either the average formula:

$$R'O(R_2SiO)_nR' \qquad (I)$$

or the general formula:

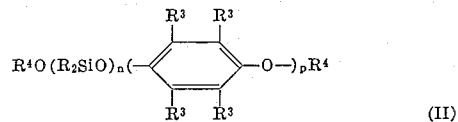

wherein $n$ is from 3 to 50; $p$ is from 1 to 50; R is a methyl, ethyl, propyl, isopropyl, butyl, amyl, vinyl, allyl, methallyl, phenyl, benzyl, tolyl, ethylphenyl or phenylethyl radical attached to the silicon atom through carbon-silicon linkage; R' is a radical selected from the group consisting of hydrogen, $R_3Si$—, $R^2CO$ and a substituted phenyl radical having the formula:

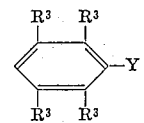

Y is a monovalent organic radical selected from the group consisting of —$NHC_6H_5$, —$OCH_2C_6H_5$, and —$NHCO(CH_2)_mCH_3$ $m$ is an integer from 1 to 20; $R^2$ is a methyl, ethyl, isopropyl, butyl or amyl radical; $R^3$ is hydrogen or an alkyl radical; $R^4$ is hydrogen or $R^2CO$; and at least one radical represented by R' in Formula I is said substituted phenyl radical.

2. An organosilicon polymer as defined by Formula I in claim 1.

3. An organosilicon polymer as defined by Formula II in claim 1.

4. An organosilicon polymer as claimed in claim 1 having the average formula:

$(CH_3)_3SiO[(CH_3)_2SiO]_n$-para-$C_6H_4NHCO(CH_2)_{16}CH_3$

5. An organosilicon polymer as claimed in claim 1 having the average formula:

$(CH_3)_3SiO[(CH_3)_2SiO]_n$-para-$C_6H_4NHC_6H_5$

6. An organosilicon polymer as claimed in claim 1 having the average formula:
para-$C_6H_5NHC_6H_4O[(CH_3)_2SiO]_m$-para-$C_6H_4NHC_6H_5$
7. An organosilicon polymer as claimed in claim 1 having the average formula:
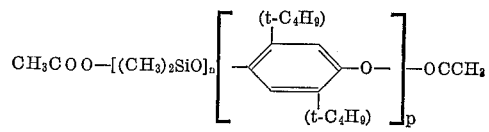
References Cited
UNITED STATES PATENTS
| | | | |
|---|---|---|---|
| 3,032,532 | 5/1962 | Bruner | 260—46.5 |
| 3,035,016 | 5/1962 | Bruner | 260—46.5 |
| 3,105,061 | 9/1963 | Bruner | 260—46.5 |
DONALD E. CZAJA, *Primary Examiner.*
LEON J. BERCOVITZ, M. I. MARQUIS,
*Assistant Examiners.*